UNITED STATES PATENT OFFICE.

CARLO BAEZNER, OF SEELZE, NEAR HANOVER, GERMANY, ASSIGNOR TO E. DE HAËN, CHEMISCHE FABRIK, LIST, G. M. B. H., OF SEELZE, NEAR HANOVER, GERMANY.

OPAQUE ENAMEL OR GLAZE COMPOSITION.

1,153,748.  Specification of Letters Patent.  Patented Sept. 14, 1915.

No Drawing.  Application filed December 20, 1913. Serial No. 808,007.

*To all whom it may concern:*

Be it known that I, CARLO BAEZNER, a citizen of the Swiss Confederation, and residing at Seelze, near Hanover, Germany, have invented a certain new and useful Improved Opaque Enamel or Glaze Composition, of which the following is a specification.

The subject-matter of my invention is an improved process of making opaque white and colored enamels and glazes.

My attempts to find a suitable substitute for stannic oxid which is used for making enamels and glazes opaque have led to the surprising result that sulfid of zinc is an excellent agent for causing white opacity. I have found that even small admixtures of it suffice for imparting complete opacity to the enamel. An admixture of about 5% added to the flux has been found to be quite sufficient, whether the flux was perfectly transparent or whether it had been made turbid beforehand during the melting process with other materials, e. g. cryolite.

The sulfid of zinc is preferably added when grinding the enamel powder. Not only can white enamels be obtained in this manner, but also any desired colored enamels and glazes by mixing the sulfid of zinc with known coloring matter or oxids. The glazes can be burnt in or baked like ordinary muffle-colors on sheet-iron, stoneware, porcelain and glass.

When luminous sulfid of zinc is employed which scarcely differs chemically from the ordinary sulfid of zinc, enamels of special phosphorescence are obtained. This phosphorescence occurs, as usual, when the articles in question are previously illuminated. Phosphorescence without previous illumination can be obtained by admixing small quantities of a radio-active substance. The radio-active substance does not require to be mixed directly with the sufid of zinc, but may be applied subsequently in the form of a solution to the already enameled articles and then baked; or the substance may be in a coating of glaze applied over the enamel.

I claim:—

1. An improved opaque enamel or glaze composition comprising a vitrifiable material admixed with sulfid of zinc.

2. An improved opaque enamel or glazed composition comprising a vitrifiable material admixed with sulfid of zinc having luminous properties.

In testimony whereof, I affix my signature in the presence of two witnesses.

CARLO BAEZNER.

Witnesses:
 T. HENDLY REED,
 AUGUST EGGEMANN.